Patented June 14, 1927.

1,632,307

UNITED STATES PATENT OFFICE.

ARTURO MIOLATI, OF PADOVA, ITALY, ASSIGNOR TO RENE LEPRESTRE, OF ROME, ITALY.

PEROXIDE OF LEAD, ZINC, AND SULPHURIC-ACID ACCUMULATORS.

No Drawing. Application filed April 22, 1924, Serial No. 708,314, and in Italy May 3, 1922.

It is well known that many proposals of galvanic combinations have long been made, even since the lead accumulators discovered by Planté were usually employed, with the object of removing some inconveniences of said accumulators to obtain at the same time a greater capacity for an equal weight and eventually a higher electromotive force. The combination of peroxide of lead, zinc and sulphuric acid in which the reactions of charge and discharge may be represented by the following equation:

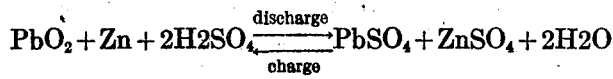

$$PbO_2 + Zn + 2H_2SO_4 \underset{\text{charge}}{\overset{\text{discharge}}{\rightleftarrows}} PbSO_4 + ZnSO_4 + 2H_2O$$

is one of the combinations repeatedly proposed, studied and abandoned.

This combination offers a greater lightness and a higher electromotive force and for an equal weight a greater capacity than the usual lead accumulator.

The first proposals of secondary elements, among which was comprised zinc sulphate, were made by the American physicists Houston and Thomson in 1879 and by the French physicist Dr. Arsonval in 1880, but the first industrial construction was only effected after 1884 by Mr. Tamine whose accumulator built by the industrial Society of Bruxelles was constituted of plates of peroxide of lead opposite to thin lead foils immersed in an electrolyte made of a solution of zinc sulphate, sulphuric acid, ammonium sulphate and mercuric sulphate; the results, however, were certainly not favorable because since that time till 1891 we have found the proposals of Meserole, Bailly, and Prof. G. T. Barker who modified the composition of the electrolyte or the nature of the negative plate.

A greater notoriety was obtained in 1898 by Reynier's experiments who employed as a negative plate thin lead or zinc foils; but the results were not such as to favor the adoption of the mentioned galvanic combination. Nor was a better result obtained by the proposals of Hills and Matthews (English Patent No. 14,501 of 14th July 1899) who proposed as negative plates thin aluminium foils, and of Lucas and News (English Patent No. 18,005 of 6/9/1899) who obtained the deposit of zinc on an amalgamated copper gauze.

The experiments with the peroxide of lead and zinc accumulator were taken up again and extended lately by Mr. Pouchain, without, however, the introduction of any new principle in the construction. The negative plate is made of thin silver plated lead foils provided with wide holes in which the thin amalgamated zinc bars are introduced, and the electrolyte is a complicated solution of sulphuric acid, zinc sulphate and sulphates of other metals, which in the scale of electromotive forces are registered above the zinc as for instance aluminium, magnesium, potassium, etc., preferably with small additions of mercuric sulphate and organic substances containing several alcoholic hydroscyl groups with or without other functional groups.

The peroxide of lead and zinc accumulators proposed and experimented till now have all shown inconveniences in their working so that their practical use has been prevented.

The principal inconvenience, of which the others are but consequences, is represented by the fact that the deposit of zinc produced during the charge is not compact, and is not adherent to the support forming the negative and is more or less rapidly dissolved in the acid electrolyte both during the charge and the open circuit. This causes a low efficiency of the element and an accumulation of zinc in the state of sulphate in the electrolyte, when electrodes of zinc are used as negative plates. The addition to the solutions of sulphates different from zinc sulphate, the amalgamation of the negative plates and the different other proposals have purposely had the object of obtaining a deposit of zinc more compact and to prevent the same from being attacked by sulphuric acid.

Now if the necessary conditions are observed for obtaining a high efficiency and a deposit of pure zinc very little attackable in an acid solution, it is clear that the conditions realized till now are certainly the least convenient. The study of the electrolysis of the solutions of zinc sulphate has shown that to obtain the effect mentioned it is necessary on the contrary:

(1) That the solution from which the zinc is deposited must be absolutely free of all the metals which are electronegative with respect to zinc;

(2) That the solution should remain pure during the electrolysis;

(3) That the cathodic density should not be below determined values.

By observing these conditions it is possible to effect the electrolysis of solutions of zinc sulphate even in an ambient corresponding to the necessary acidity for the functioning of the peroxide plate. The acid solution of zinc sulphate should be therefor deprived of arsenic, antimony, tin, copper, nickel, manganese, iron, etc., as well as of the impurities noxious to the functioning of the positive plate, among which are to be mentioned the compounds of chlorine and nitrogen. Especially noxious is the presence of nickel and antimony traces, even small quantities of few m/m g. for each liter of solution preventing the zinc from being deposited compactly on the negative plate, and favouring the dissolution when the circuit is open. To preserve the electrolyte pure it is moreover necessary that the positive plate should not be formed of a common lead accumulator plate, these plates being constructed by using for the support antimonial or hard lead and commercial lead oxide all of them containing antimony.

In the construction of an accumulator according to the present invention it is then necessary that the peroxide of the lead plate should have a support made of very pure lead and that the active mass of peroxide of lead be deprived of all the impurities mentioned. As a plate so formed for high charging loads and strains of discharge may be liable to bend, the support of pure lead may be eventually reinforced by means of special devices or made of convenient lead alloys. In the same way the support for the negative plate must not be made entirely of pure zinc. This is necessary since, due to excessive discharges and slow local action which always occurs even with the purest zinc and sulphuric acid, the support would wear out and the zinc sulphate in the electrolyte would increase beyond the required and desired quantity.

It is therefore necessary to choose a metal or an alloy different from zinc, showing but little difference in potential with respect to zinc, and not subject to attack by sulphuric acid. For example, a hard rigid netting of lead saturated with zinc (2-3% of Zn) has proven to be very well adapted for this purpose. It is also possible to use an aluminium grating electrode upon which a thin coating of zinc has been deposited by subsequently heating the electrode to the fusing temperature of zinc. In this matter there is obtained an electrode of aluminium covered with zinc and aluminium alloy.

It is also possible for this purpose to use the alloy known commercially as "ilium".

Under these conditions the electrolyte can be formed of a solution of zinc and sulphuric acid and a small quantity of zinc sulphate can be added to give a light basic molecular layer on the cathode which renders the oxidation of deposited zinc more difficult.

Having now particularly described and ascertained the nature of my said invention and in what manner the same is to be performed I declare that what I claim is:

1. In a sulphuric acid accumulator, a positive plate composed entirely of absolutely pure lead and peroxide of lead, a negative plate composed of non-zinciferous material, and an electrolyte free from any trace of impurities more electrolytically negative than zinc.

2. In a sulphuric acid accumulator, a positive plate composed entirely of absolutely pure lead and peroxide of lead, a negative plate composed of non-zinciferous material, having but slight difference in potential with respect to zinc and an electrolyte of sulphuric acid free from any trace of impurities more electrolytically negative than zinc.

3. In a sulphuric acid and zinc sulfate accumulator, a positive plate composed entirely of absolutely pure lead, a negative plate composed of a metallic material different from zinc, and with a potential slightly different from zinc and an electrolyte of sulphuric acid free from any trace of impurities more electrolytically negative than zinc.

4. In a sulphuric acid and zinc sulphate accumulator, a positive plate composed entirely of absolutely pure lead and peroxide of lead, a negative plate composed of a metallic material different, and varying in potential only slightly, from zinc and an electrolyte of sulphuric acid free from any trace of impurities more electrolytically negative than zinc.

In testimony whereof I have hereunto signed my name.

PROF. DR. ARTURO MIOLATI.